(12) United States Patent
McAllister et al.

(10) Patent No.: US 6,241,073 B1
(45) Date of Patent: Jun. 5, 2001

(54) WOOD ALIGNING AND ORIENTING CONVEYOR

(75) Inventors: Barry James McAllister, Bowen Island; Radu Lucian Marcea, North Vancouver, both of (CA)

(73) Assignee: CAE Machinery Ltd. (CA)

( * ) Notice: Subject to any disclaimer, the term of this patent is extended or adjusted under 35 U.S.C. 154(b) by 0 days.

(21) Appl. No.: 09/514,239

(22) Filed: Feb. 28, 2000

(51) Int. Cl.[7] .................................................. B65G 47/24
(52) U.S. Cl. .............................................................. 198/382
(58) Field of Search ..................................... 198/382, 383, 198/340, 392, 533, 387

(56) References Cited

U.S. PATENT DOCUMENTS

| | | |
|---|---|---|
| 2,753,976 | 7/1956 | Fitzmaurice ............................ 198/33 |
| 3,184,035 * | 5/1965 | Wiley ................................. 198/382 X |
| 4,440,287 | 4/1984 | Lund et al. ............................. 198/382 |
| 4,494,919 | 1/1985 | Knudson et al. ...................... 425/83.1 |
| 4,666,029 | 5/1987 | Burkner ................................. 198/382 |
| 4,826,388 | 5/1989 | Golding ............................. 414/684.3 |
| 5,325,954 | 7/1994 | Crittenden et al. .................... 198/382 |
| 5,363,950 | 11/1994 | Lacuna et al. ......................... 198/382 |
| 5,404,990 | 4/1995 | Barnes et al. .......................... 198/382 |
| 5,871,080 * | 2/1999 | Manzi et al. ...................... 198/382 X |

* cited by examiner

*Primary Examiner*—James R. Bidwell
(74) *Attorney, Agent, or Firm*—Townsend and Townsend and Crew LLP

(57) ABSTRACT

Apparatus for aligning and orienting generally elongate objects of irregular shape and variable dimensions such as wood residue. The apparatus includes a plurality of spaced, rollers to transport the objects in a direction of transport from an inlet zone through a sorting zone to an outlet zone by rotation of the rollers. There are a plurality of aligning walls extending over the rollers parallel to the direction of transport from the outlet zone toward the inlet zone. There are also eccentric vanes mounted to some of the rollers to rotate with the rollers to move through the objects on the rollers. Objects introduced into the inlet zone in a generally random, entangled collection are aligned and oriented in the direction of transport into generally, parallel, stacked relationship at the outlet zone by movement over the rollers between the aligning walls subject to the action of the eccentric vanes. The apparatus is particularly suited for organizing a random pile of loose and tangled wood debris into an aligned and organized stream of wood pieces for further processing.

18 Claims, 5 Drawing Sheets

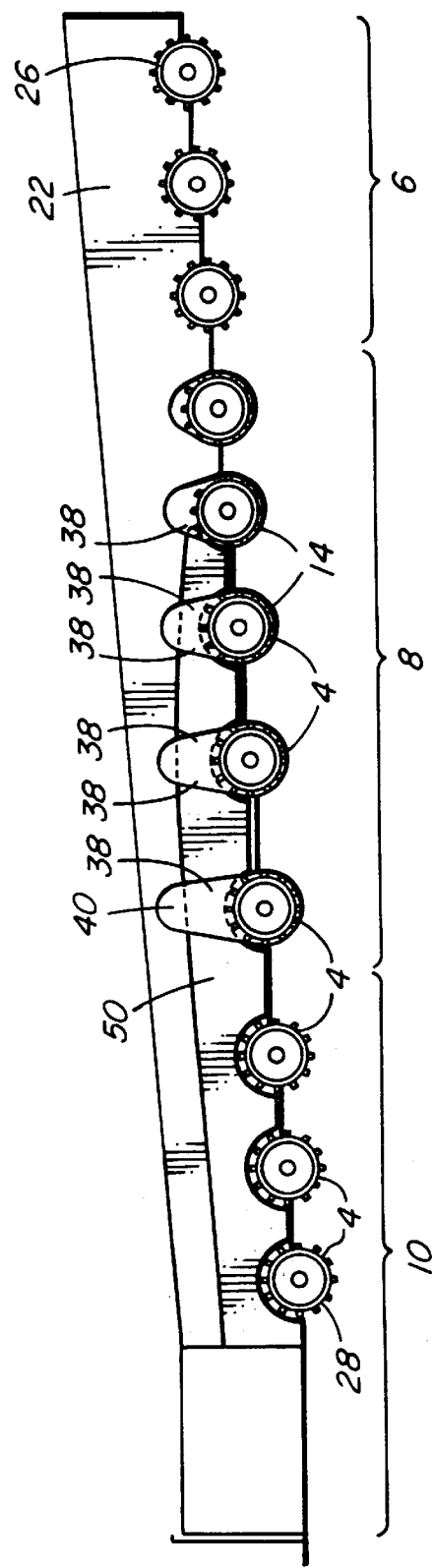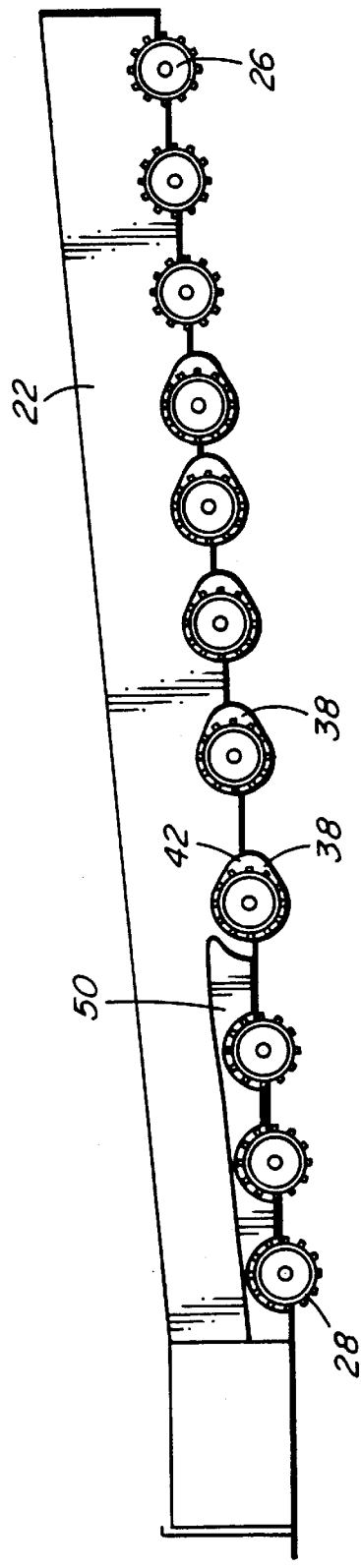

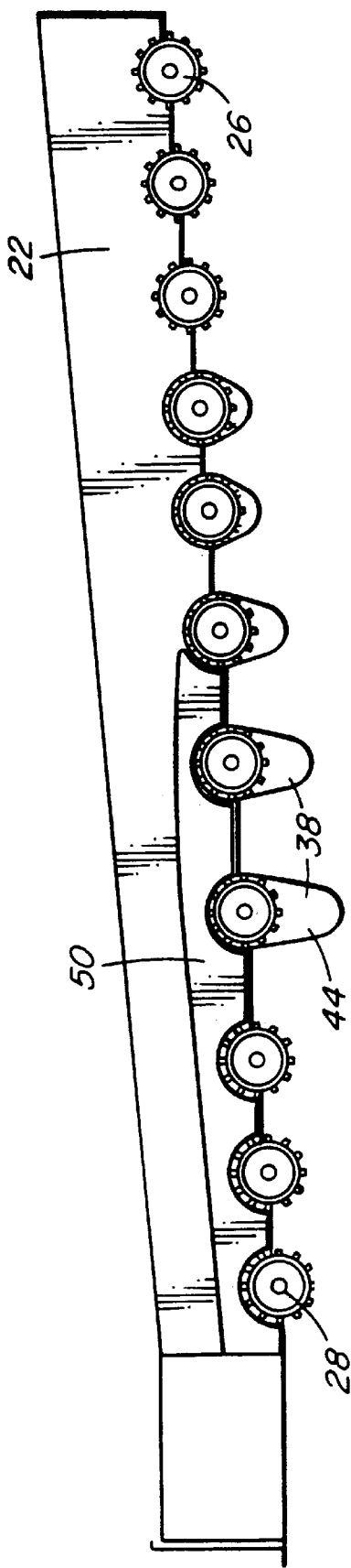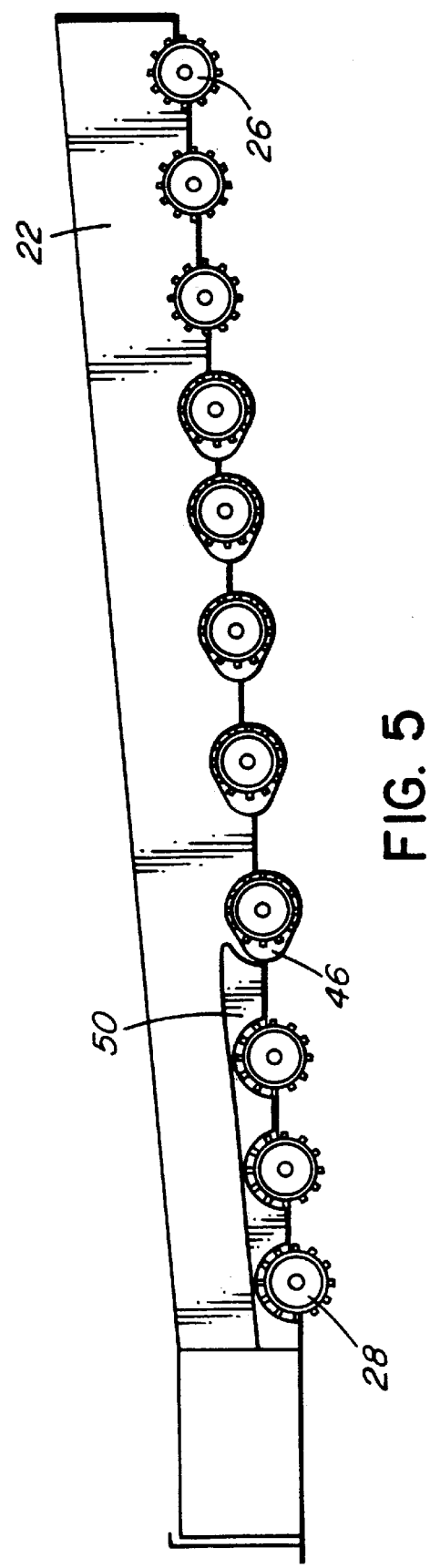
FIG. 4
FIG. 5

WOOD ALIGNING AND ORIENTING CONVEYOR

FIELD OF THE INVENTION

This invention relates to a material handling and processing conveyor and, more particularly, to a wood aligning and orienting conveyor for converting a random pile of loose and tangled wood debris into an aligned and organized stream of wood pieces.

BACKGROUND OF THE INVENTION

Wood residue comes from different sources ranging from natural debris on the forest floor to man-made residues from activities such as forest management (thinning and pruning), harvesting, transporting, dry land sorting and sawmill processing of lumber. In particular, the wood residue generated by forest harvesting, transporting the trees to mills, and sorting is mainly formed of split, broken and rejected logs, tree tops, limbs and branches. Wood residue generated by sawmill processing is generally in the form of slabs, edgings and trimmings. All of the above wood residues are characterized by pieces with highly irregular shapes and variable dimensions. Wood residues tend to be collected into loose piles of jumbled and tangled pieces that are difficult to handle and sort as will be described below.

Traditionally, the portion of the wood residues classified as "good, clean fiber" is chipped and sold for pulp. While wood residue from forest management activities is processed by mobile equipment, the rest is handled by dedicated fixed machinery such as chippers and hogs. Due to problems with the handling, sorting and processing of wood residues, the remainder of the wood residues are burned for fuel or dumped to landfill. However, increasing public pressure due to environmental concerns has resulted in federal and local regulators attempting to discourage the waste of wood residues by taking steps to issue fewer burning permits, enacting tighter air quality control and emission requirements and restricting land usage. These steps have prompted the forest industry to take another look at wood residues, which are becoming more and more of a liability, with a view to converting the residues more completely to a source of fiber.

A major step toward the efficient conversion of more wood residues to usable material such as wood flakes or other value added wood fibers is the development of appropriate machinery for effective sorting and handling of the irregularly shaped and dimensioned wood residue. By processing wood residues, additional value is extracted from what was formerly wood waste which will improve a mill's recovery factor and directly influence its profitability.

In the past, various handling and sorting systems have been developed to handle non-uniform materials.

U.S. Pat. No. 2,753,976 to Fitzmaurice discloses an aligning conveyor which relies on a series of conveyor rollers rotating at successively faster speeds to align articles on the conveyor.

U.S. Pat. No. 4,440,287 to Lund et al. discloses an aligning apparatus for wood flakes.

U.S. Pat. No. 4,826,388 to Bielagus discloses an apparatus for sorting material by length that relies on articles of a defined length passing through gaps between adjacent conveyor rollers.

U.S. Pat. No. 5,363,950 to Lacuna et al. discloses a lumber organizer having drums that are rotated at a greater speed than the infeed conveyor to align the lumber.

The following patents disclose further examples of material handling equipment:

U.S. Pat. No. 4,494,919 to Knudson et al.
U.S. Pat. No. 4,666,029 to Bürkner
U.S. Pat. No. 5,325,954 to Crittenden et al.
U.S. Pat. No. 5,404,990 to Barnes et al.

None of the apparatus and techniques disclosed in the foregoing references is particularly well suited to sorting materials such as wood residues formed from a random collection of tangled and jumbled irregular, elongate pieces.

SUMMARY OF THE INVENTION

In view of the foregoing discussion, there is a need for a wood orienting and aligning system that is capable of organizing wood residues from a variety of sources such as the forest, wood rooms and sawmills to permit further efficient processing to produce usable, quality wood fiber.

The present invention provides a wood aligning and orienting conveyor that addresses the above objects. Accordingly, the present invention provides apparatus for aligning and orienting generally elongate objects of irregular shape and variable dimensions comprising:

a plurality of spaced, rollers to transport the objects in a direction of transport from an inlet zone through a sorting zone to an outlet zone by rotation of the rollers;

a plurality of aligning walls extending over the rollers parallel to the direction of transport from the outlet zone toward the inlet zone; and eccentric vanes mounted to some of the plurality of rollers to rotate with said rollers to be movable through the objects on the rollers;

whereby objects introduced into the inlet zone in a generally random, entangled collection are aligned and oriented in the direction of transport into generally, parallel, stacked relationship at the outlet zone by movement through the sorting zone over the rollers between the aligning walls subject to the action of the eccentric vanes.

The wood aligning and orienting conveyor of the present invention will convert a random pile of loose and tangled wood debris into an aligned and organized stream of wood pieces ready for subsequent fiber processing operations.

BRIEF DESCRIPTION OF THE DRAWINGS

Aspects of the present invention are illustrated, merely by way of example, in the accompanying drawings in which:

FIG. 2 is a section view adjacent the central aligning wall of the conveyor as shown in FIG. 1;

FIG. 3 is a section view taken along one of the aligning walls indicated by reference letter C in FIG. 1;

FIG. 4 is a section view taken along one of the aligning walls indicated by reference letter B in FIG. 1;

FIG. 5 is a section view taken along another one of the aligning walls indicated by reference letter C in FIG. 1;

DESCRIPTION OF THE PREFERRED EMBODIMENTS

Figure 1:
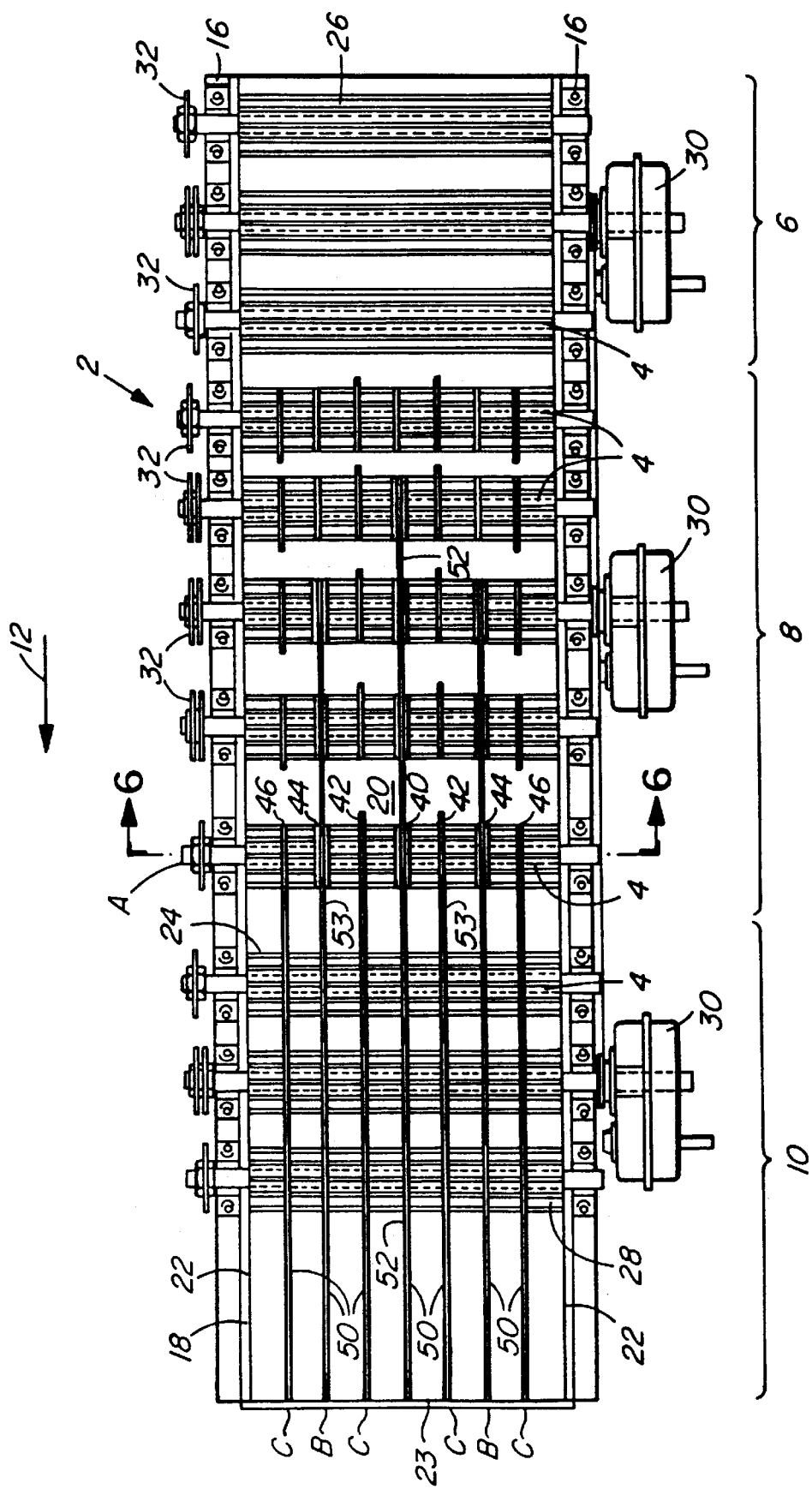
FIG. 1 is a plan view of an aligning and orienting conveyor according to a preferred embodiment of the present invention.

Referring to FIG. 1, there is shown a plan view of a preferred embodiment of the aligning and orienting conveyor 2 of the present invention. The illustrated apparatus is intended for sorting wood residues in the form of a random pile of loose and tangled wood debris into generally parallel, stacked organized stream for more efficient processing by additional equipment. It will be appreciated by those skilled in the art that the present invention is useful for sorting any type of material formed from elongate objects of irregular shape and variable dimensions.

The apparatus comprises a plurality of spaced, rollers 4 adapted to transport wood residue objects from an inlet zone 6 through a sorting or aligning and orienting zone 8 to an outlet zone 10 in a direction of transport indicated by arrow 12. Rollers 4 are preferably formed with radially extending ribs 14 to assist in advancing objects on the rollers in the direction of movement. Rollers 4 extend transverse to the direction of movement and are rotatably supported at each end by bearings 16

Rollers 4 extend through a trough structure 18 having a floor 20 and upstanding side walls 22 to define an enclosed region in which wood debris is transported and sorted. The transverse cross-sectional structure of the apparatus of the present invention is best shown in FIGS. 6 to 9, however, floor 20 of the trough structure is omitted from these Figures for the sake of clarity. Trough floor 20 is formed with an array of transverse slots 24 through which rollers 4 partially protrude into the base of the conveyor.

As best shown in FIGS. 2–5 which are longitudinal cross-sections through the apparatus of the present invention parallel to the direction of transport 12, rollers 4 are preferably arranged in a descending configuration with the highest roller 26 being at the start of the inlet zone 6 and the lowest roller 28 being at the end of the outlet zone 10. By virtue of this arrangement, gravity is used to assist movement of wood residue pieces over the rollers.

In order to align and orient the entangled collection of wood residue pieces introduced at the inlet zone, the apparatus relies on a plurality of aligning walls extending adjacent trough floor 20 from the outlet zone and eccentric vanes associated with rollers 4. The inlet zone 6, aligning and orienting zone 8 and outlet zone 10 of the conveyor each have different roller, aligning wall and eccentric vane configurations as will be discussed below. As best shown in FIG. 1, rollers 4 are organized into different groups corresponding to each zone with the rollers in a zone being driven by a different drive motor 30. In a conventional chain drive arrangement, a single roller in each zone is driven directly by motor 30 and the remaining rollers are rotated by chains extending from the driven roller to engage drive sprockets 32 at an end of each roller. This arrangement makes it possible to drive the rollers in different zones at different speeds. This is necessary to accommodate variations in the residual wood bulk density induced by alignment and orientation as will be explained in more detail below.

In the illustrated embodiment, the inlet zone 6 extends over three rollers which are unmodified. The inlet zone receives wood residue from a manual or mechanical feeder. The wood residue comprises essentially a jumbled collection of entangled elongate objects and the rollers in the inlet zone act simply to advance the collection of objects to the aligning and orienting zone 8.

As best shown in FIGS. 2–5, each roller 4 in aligning and orienting zone 8 is modified to include eccentric vanes 38 that extend radially outwardly from the ribbed surface of the roller. Vanes 38 are rigidly mounted to the rollers to rotate with the rollers so that the vanes are moved through the collection of entangled wood pieces in order to separate and align the pieces on the rollers. Slots are formed in floor 20 of trough structure 18 to permit rotary movement of the vanes. As well, the rollers are spaced to accommodate movement of the vanes. As the rollers rotate, vanes 38 extend and move through the collection of entangled wood pieces above the level of the rollers to disturb the inherent structure of the pieces and impart a slight sideways movement transverse to the direction of transport 12.

Referring to FIG. 1, a plurality of aligning walls 50 are also provided to preserve the alignment of wood pieces caused by vanes 38 and to direct movement of the wood pieces in the direction of transport 12. Walls 50 extend upstream along the floor 20 of the trough structure 18 from outlet zone 10 into the aligning and orienting zone 8.

To facilitate the separation and alignment process, eccentric vanes 38 are preferably formed into specific configurations on rollers 4. For example, with reference to FIG. 1, on each roller, vanes 38 are positioned at spaced intervals along the longitudinal axis of the roller. Preferably, there is a central eccentric vane 40 with additional vanes being positioned in a symmetric pattern on either side of central vane 40. It is also preferable that each vane 38 is positioned in the same plane as an aligning wall 50.

Figure 6:
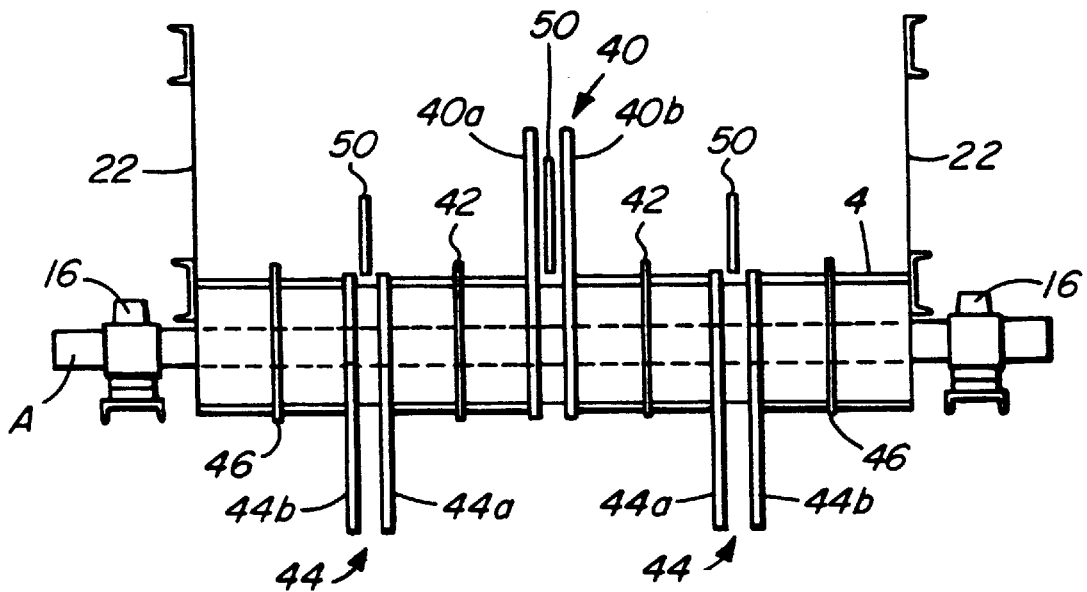
FIG. 6 is a section view taken along line 6—6 of FIG. 1 showing the typical construction of a roller and the eccentric vanes extending radially from the roller.

Furthermore, vanes 38 are distributed at off-set angles with respect to adjacent vanes about the perimeter of the roller as best shown in FIGS. 6–9. FIG. 6 is a section view taken along line 6—6 of FIG. 1 showing a typical construction of a roller A. FIG. 6 shows roller A oriented as in FIG. 1 with central vane 40 extending upwardly. The next outermost pair of vanes 42 on either side of central vane 40 are off-set from the central vane by 90 degrees and extend generally horizontally in an upstream direction (see FIG. 1). The next outermost pair of vanes 44 are off-set again at an angle of 180 degrees to central vane 40 to extend generally downwardly. The final outermost pair of vanes 46 are off-set from central vane 40 by 270 degrees and extend generally horizontally in a downstream direction (see FIG. 1).

Figure 7:
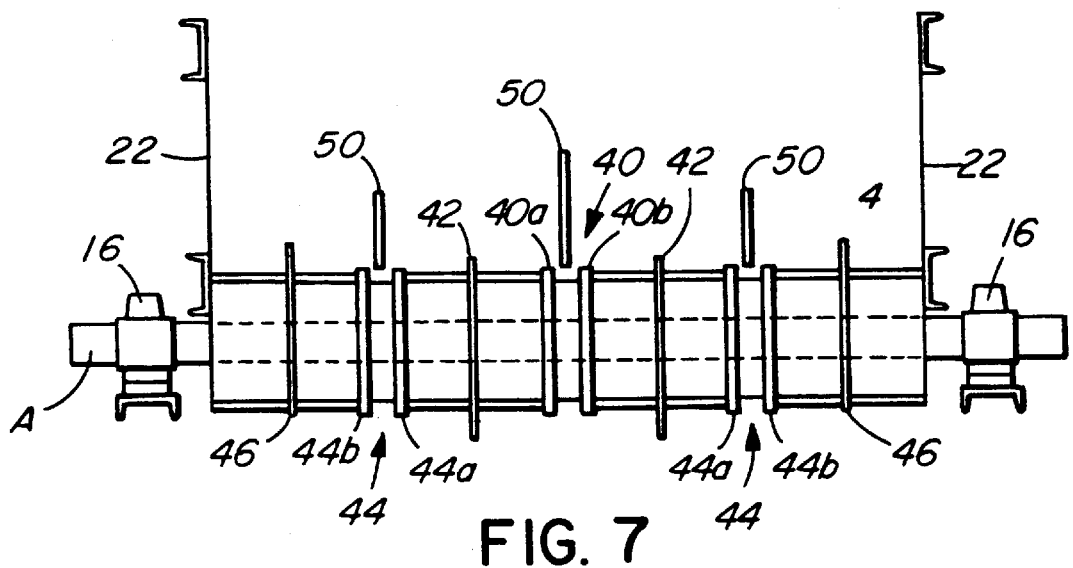
FIG. 7 is a section view similar to FIG. 6 with the roller rotated through 90 degrees from the position shown in FIG. 6.
Figure 8:
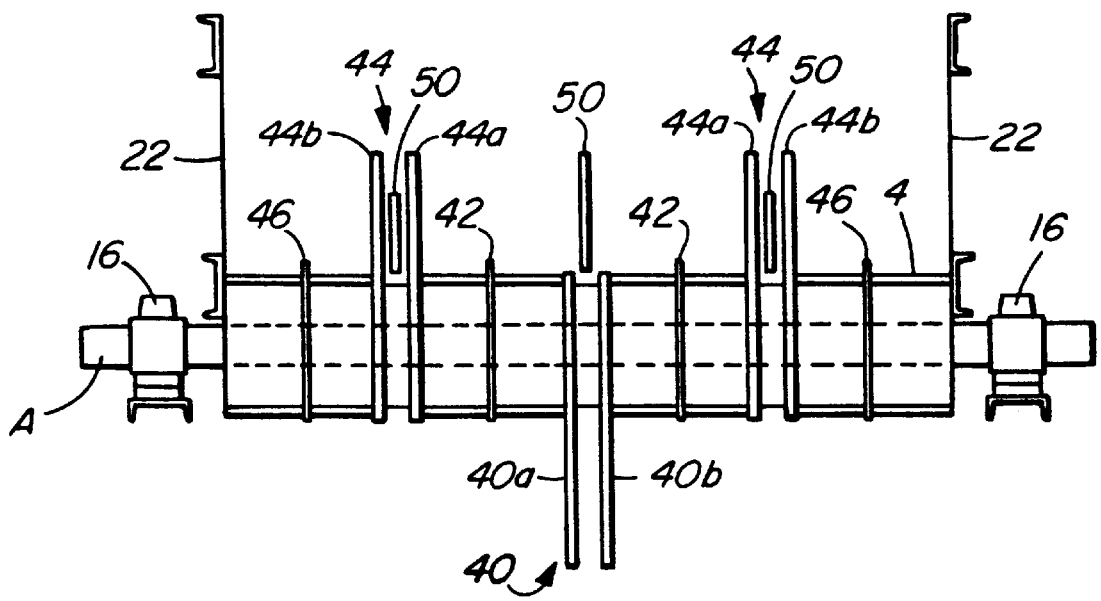
FIG. 8 is a section view similar to FIG. 6 with the roller rotated through 180 degrees from the position shown in FIG. 6.
Figure 9:
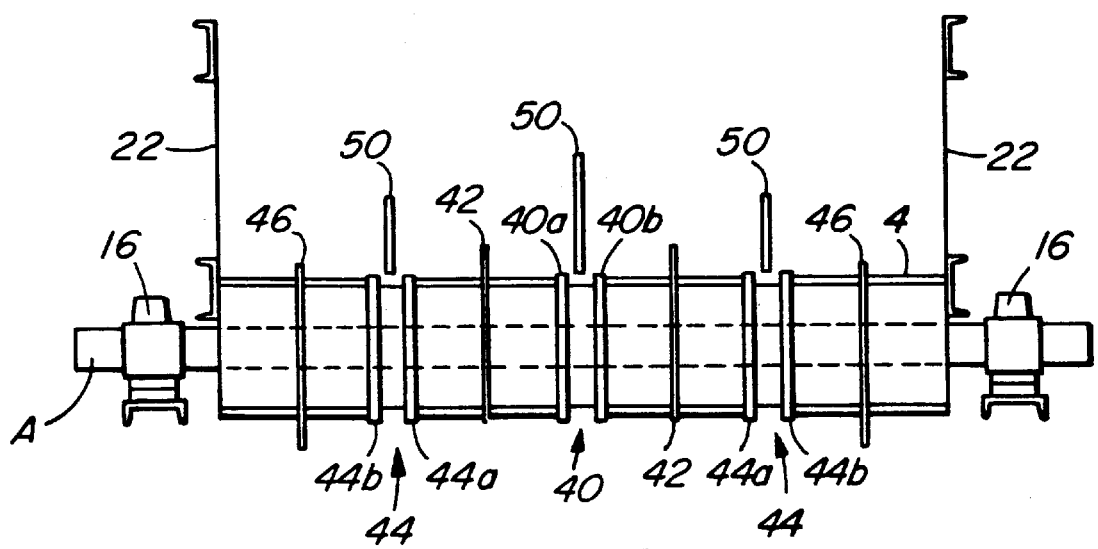
FIG. 9 is a section view similar to FIG. 6 with the roller rotated through 270 degrees from the position shown in FIG. 6.

FIGS. 7–9 show the same roller A as in FIG. 6 as the roller will appear when it is rotated through 90 degree increments. The aligning walls 50 that extend to or past roller A are also shown in FIGS. 6–9. Note that the larger eccentric vanes 40 and 44 that rotate past aligning walls 50 are formed from pairs of closely spaced members 40a, 40b and 44a, 44b, respectively. The paired members define a slot therebetween to accommodate rotatable movement of the members past the aligning walls. The paired members also act as wipers to clear any residual wood pieces that might straddle the aligning walls 50.

Referring to FIGS. 2–5, it is also apparent that eccentric vanes 38 vary in length along each of the rollers. FIGS. 2–5 are section views along the lengths of various aligning walls and illustrate that the vanes are arranged in a symmetric pattern on either side of the central vane 40. FIGS. 2–5 also show that the lengths of the some of the eccentric vanes of each roller increase at each subsequent roller in the direction of transport.

The foregoing arrangement of eccentric vanes 38 results in the central vane 40 of each roller first impacting the wood residue pieces from below followed by successive symmetrically adjacent pairs of vanes moving outwardly along the roller from the central vane. The result is that the collection of wood pieces experiences a splitting action equivalent to the wave-parting action at a boat's bow. In addition, due to the increase in the length of some of the eccentric vanes in the downstream direction, the sorting action of the vanes becomes more vigorous as the material travels toward the outlet zone. The larger the size of a vane, the farther it extends into the collection of wood pieces to exert sorting forces on more of the wood residue.

While aligning and orienting forces are exerted by the rotating eccentric vanes, aligning walls 50 perform the function of maintaining aligned wood pieces in their desired orientation. As shown in FIGS. 1–5, aligning walls 50 preferably extend from outlet zone 10 in different lengths. There is a central aligning wall 52 which extends through the outlet zone and substantially through the length of the aligning and orienting zone 8. Aligning walls on each side of the central wall are arranged in a pattern of groups of walls to divide the sorting zone on either side of the central aligning wall into successively narrower portions with each successive group of walls being shorter in length than the preceding group. For example, in FIG. 1, the first group of walls are labelled by the reference letter B. There are two such walls which divide the sorting zone on each side of central aligning wall 52 in half. The second group of walls are labelled C. There are four of these walls and each wall divides in half the space between the central aligning wall 52 and the group B walls and the space between the group B walls and the side walls 22 of the conveyor trough structure 18.

As best shown in FIGS. 2–5, central aligning wall 52 extends to a pre-determined height above the rollers with adjacent aligning walls on each side of the central wall being lower. Preferably, the group B walls are higher than the group C walls. It is also possible for the group B and C walls to be of the same dimensions. The height of each aligning wall increases gradually from its upstream end to reach a maximum height that remains substantially constant through the outlet zone. The aligning walls are positioned in line with the eccentric vanes and the maximum height of the walls is dictated by the size of the eccentric vanes. The vanes must be longer than the walls so that the vanes extend past the walls into the material to be sorted as the rollers are rotated.

The foregoing arrangement of the aligning walls 50 creates a combined structure within the side walls of the trough that has a narrowed tip defined by central wall 52 that points into the oncoming wood residue material.

The final zone in the apparatus of the present invention is the outlet zone 10 which preferably includes a plurality of unmodified rollers 4. Outlet zone 10 is an accumulation region where aligned and oriented wood pieces, restricted by aligning walls 50, is collected. Rollers 4 in outlet zone 10 are driven at a slower speed in order to compact the aligned wood pieces against end wall 23 of trough structure 18 and increase the bulk density of the sorted pile. Aligned and oriented wood pieces collected in outlet zone 10 can be delivered in batches to additional processing equipment for further operations such as bundling, strapping, chipping or flaking.

In use, the apparatus of the present invention functions as follows:

Residual wood is fed manually or by mechanical means into inlet zone 6. The residual wood will have a generally nest-like structure with long pieces intertwined and tangle with each other and shorter pieces filling is some of the internal spaces. The bottom of the residual wood collection will contact the ribbed rollers 4 to start the transport process. The cascading arrangement of the rollers in the inlet zone and throughout the remainder of the apparatus will tend to disturb the wood collection and slowly separate the shorter pieces to collect at the bottom of the wood residue structure.

On entry into the aligning and orienting zone 8, the wood pieces will encounter the first roller fitted with the shortest eccentric vanes. The vanes will move upwardly through the shorter wood pieces. The thrusting and separating action of the eccentric vanes starts at the center of each roller and continues outwardly to the trough side walls in view of the dimensioning of the vanes and their off-set configuration. This sequential thrusting of the vanes through the wood residue collection is designed to allow the wood pieces to settle into a new, more ordered pattern. In addition, the bow wave parting action created by the rotation of eccentric vanes introduces an additional level of order into the wood piece collection.

The farther the wood residue travels down the conveyor, the more vigorous the action of the eccentric vanes becomes due to the increase in vane length. There is the consideration that, past a certain point of induced order, the eccentric vane action may destroy the alignment of shorter wood pieces adjacent the floor 20 of the trough. To counteract this tendency, the aligning walls are provided to preserve the orientation of aligned wood pieces. The aligning walls increase in height in the direction of transport to accommodate the large volume of wood pieces that are oriented during movement through zone 8. The height increase allows larger diameter wood pieces to slowly rise at the top of the pile of oriented pieces and ride atop smaller pieces while still being constrained between the aligning walls.

At outlet zone 10, the wood pieces have been substantially aligned and are now maintained in their oriented configuration by continuous aligning walls. An aligned residual wood pile with most of the shorter pieces at the bottom will tend to occupy a lesser volume than the original unsorted wood residue pile. Therefore, the rollers in the outlet zone are operated at slightly slower speed than the adjacent aligning and orienting zone to allow more aligned material to be compacted into the outlet zone to fill up gaps and increase the bulk density of the collected material.

Although the present invention has been described in some detail by way of example for purposes of clarity and understanding, it will be apparent that certain changes and modifications may be practised within the scope of the appended claims.

I claim:

1. Apparatus for aligning and orienting generally elongate objects of irregular shape and variable dimensions comprising:
   a plurality of spaced, rollers to transport the objects in a direction of transport from an inlet zone through a sorting zone to an outlet zone by rotation of the rollers;
   a plurality of aligning walls extending over the rollers parallel to the direction of transport from the outlet zone toward the inlet zone; and
   eccentric vanes mounted to some of the plurality of rollers to rotate with said rollers to be movable through the objects on the rollers;
   whereby objects introduced into the inlet zone in a generally random, entangled collection are aligned and oriented in the direction of transport into generally, parallel, stacked relationship at the outlet zone by movement through the sorting zone over the rollers between the aligning walls subject to the action of the eccentric vanes.

2. Apparatus as claimed in claim 1 including a trough structure having a floor to define a surface over which the objects are transported, the trough structure including an array of slots in the floor through which the rollers and eccentric vanes protrude into the trough.

3. Apparatus as claimed in claim 1 in which the rollers are arranged in a descending configuration with the highest roller being at the inlet zone and the lowest roller being at the outlet zone to use gravity to assist movement of objects on the rollers.

4. Apparatus as claimed in claim 1 in which the rollers are ribbed.

5. Apparatus as claimed in claim 1 in which the plurality of aligning walls include a central aligning wall extending upstream from the outlet zone with the other aligning walls being dimensioned and oriented to extend upstream from the outlet zone in a symmetric pattern on either side of the central aligning wall.

6. Apparatus as claimed in claim 5 in which the central aligning wall extends to adjacent the inlet zone with the aligning walls on each side of the central wall being arrayed in a pattern of groups of walls to divide the sorting zone on either side of the central aligning wall into successively narrower portions with each successive group of aligning walls being shorter in length than the preceding group.

7. Apparatus as claimed in claim 5 in which the central aligning wall extends to a pre-determined height above the rollers with the aligning walls on each side of the central wall being arrayed in a pattern of groups of walls to divide the sorting zone on either side of the central aligning wall into successively narrower portions with each successive group of aligning walls being lower in height than the preceding group.

8. Apparatus as claimed in claim 5 in which the central aligning wall extends to a pre-determined height above the rollers with the aligning walls on each side of the central wall being arrayed in a pattern of groups of lower walls to divide the sorting zone on either side of the central aligning wall into successively narrower portions with all of the groups of aligning walls being the same height.

9. Apparatus as claimed in claim 1 in which each of rollers equipped with eccentric vanes has the eccentric vanes positioned at spaced intervals along the roller.

10. Apparatus as claimed in claim 9 in which the eccentric vanes are positioned on each roller in a symmetric pattern on either side of a central eccentric vane with each vane being positioned in a plane defined by one of the plurality of aligning walls.

11. Apparatus as claimed in claim 10 in which the length of the central eccentric vane is the maximum and the length of adjacent vanes on each side of the central vane is determined by the dimensions of the aligning wall defining the plane in which the vane is positioned.

12. Apparatus as claimed in claim 9 in which the eccentric vanes are arranged to extend radially outwardly from the rollers.

13. Apparatus as claimed in claim 9 in which the eccentric vanes of each roller are distributed in a symmetric pattern on opposite sides of a central eccentric vane with each vane being radially off-set with respect to adjacent vanes.

14. Apparatus as claimed in claim 9 in which the eccentric vanes of the rollers are arranged such that the length of an eccentric vane at a particular position on a roller increases at the same position on subsequent rollers in the direction of transport.

15. Apparatus as claimed in claim 9 in which the eccentric vanes of the rollers are arranged such that the length of an eccentric vane at a particular position on a roller remains the same at the same position on subsequent rollers in the direction of transport.

16. Apparatus as claimed in claim 10 in which some of the eccentric vanes are formed from two closely spaced members defining a slot therebetween to accommodate rotatable movement of the members past the aligning walls.

17. Apparatus as claimed in claim 1 in which the plurality of rollers are divided into groups with each group of rollers being driven at a different speed.

18. Apparatus as claimed in claim 17 in which the groups comprise rollers in the inlet zone, rollers in the outlet zone and rollers in the sorting zone.

* * * * *